(12) United States Patent
Toshniwal

(10) Patent No.: US 12,025,450 B2
(45) Date of Patent: Jul. 2, 2024

(54) ROUTE COMPARISON FOR VEHICLE ROUTING

(71) Applicant: Uber Technologies, Inc., San Francisco, CA (US)

(72) Inventor: Ankur Toshniwal, Monroe, NJ (US)

(73) Assignee: Uber Technologies, Inc., San Francisco, CA (US)

( * ) Notice: Subject to any disclaimer, the term of this patent is extended or adjusted under 35 U.S.C. 154(b) by 316 days.

(21) Appl. No.: 17/454,804

(22) Filed: Nov. 12, 2021

(65) Prior Publication Data

US 2022/0155082 A1 May 19, 2022

Related U.S. Application Data

(60) Provisional application No. 63/198,798, filed on Nov. 13, 2020.

(51) Int. Cl.
*G01C 21/34* (2006.01)

(52) U.S. Cl.
CPC ..... *G01C 21/3446* (2013.01); *G01C 21/3492* (2013.01)

(58) Field of Classification Search
None
See application file for complete search history.

(56) References Cited

U.S. PATENT DOCUMENTS

| | | | | |
|---|---|---|---|---|
| 9,702,716 B2* | 7/2017 | Siegel | | G01C 21/367 |
| 10,768,621 B1* | 9/2020 | Nix | | G05D 1/0088 |
| 2008/0208445 A1* | 8/2008 | Bolton | | G01C 21/3461 |
| | | | | 701/533 |
| 2014/0104112 A1* | 4/2014 | May | | G01S 5/0242 |
| | | | | 342/450 |
| 2014/0278071 A1* | 9/2014 | San Filippo | | G01C 21/3492 |
| | | | | 701/465 |
| 2015/0369615 A1* | 12/2015 | Dzyuba | | G01C 21/32 |
| | | | | 701/408 |
| 2017/0039865 A1* | 2/2017 | Takabayashi | | G08G 3/02 |
| 2018/0038693 A1* | 2/2018 | Dong | | G06F 16/9537 |
| 2018/0107216 A1* | 4/2018 | Beaurepaire | | G06Q 30/0261 |

(Continued)

FOREIGN PATENT DOCUMENTS

CN 102034241 A * 4/2011

*Primary Examiner* — Daniel L Greene
(74) *Attorney, Agent, or Firm* — Schwegman Lundberg & Woessner, P.A.

(57) ABSTRACT

Various examples are directed to systems and methods for routing an autonomous vehicle. A comparison engine may access first route data describing a first route and second route data describing a second route. The comparison engine may generate first normalized route data using the first route data, where the first normalized route data comprises a first plurality of normalized positions along the first route. The comparison engine may also generate second normalized route data using the second route data, where the second normalized route data comprises a second plurality of normalized positions along the second route. The route comparison engine may compare a first position from a first plurality of normalized positions with a first corresponding position from the second plurality of normalized positions and may instruct an autonomous vehicle to begin executing an autonomous vehicle route based at least in part on the comparing.

20 Claims, 8 Drawing Sheets

(56) References Cited

U.S. PATENT DOCUMENTS

2018/0293595 A1* 10/2018 McMaster .......... G01C 21/3626
2021/0341302 A1* 11/2021 Duym ................ G01C 21/3407
2022/0107967 A1*  4/2022 Hoffman .............. G01C 21/005

* cited by examiner

ROUTE COMPARISON FOR VEHICLE ROUTING

CLAIM FOR PRIORITY

This application claims the benefit of priority of U.S. Provisional Application Ser. No. 63/198,798, filed Nov. 13, 2020, which is hereby incorporated by reference in its entirety.

FIELD

This document pertains generally, but not by way of limitation, to devices, systems, and methods for routing, operating, and/or managing vehicles, such as autonomous vehicles (AVs).

BACKGROUND

An autonomous vehicle is a vehicle that is capable of sensing its environment and operating some or all of the vehicle's controls based on the sensed environment. An autonomous vehicle includes sensors that capture signals describing the environment surrounding the vehicle. The autonomous vehicle processes the captured sensor signals to comprehend the environment and automatically operates some or all of the vehicle's controls based on the resulting information.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DESCRIPTION

Figure 1:
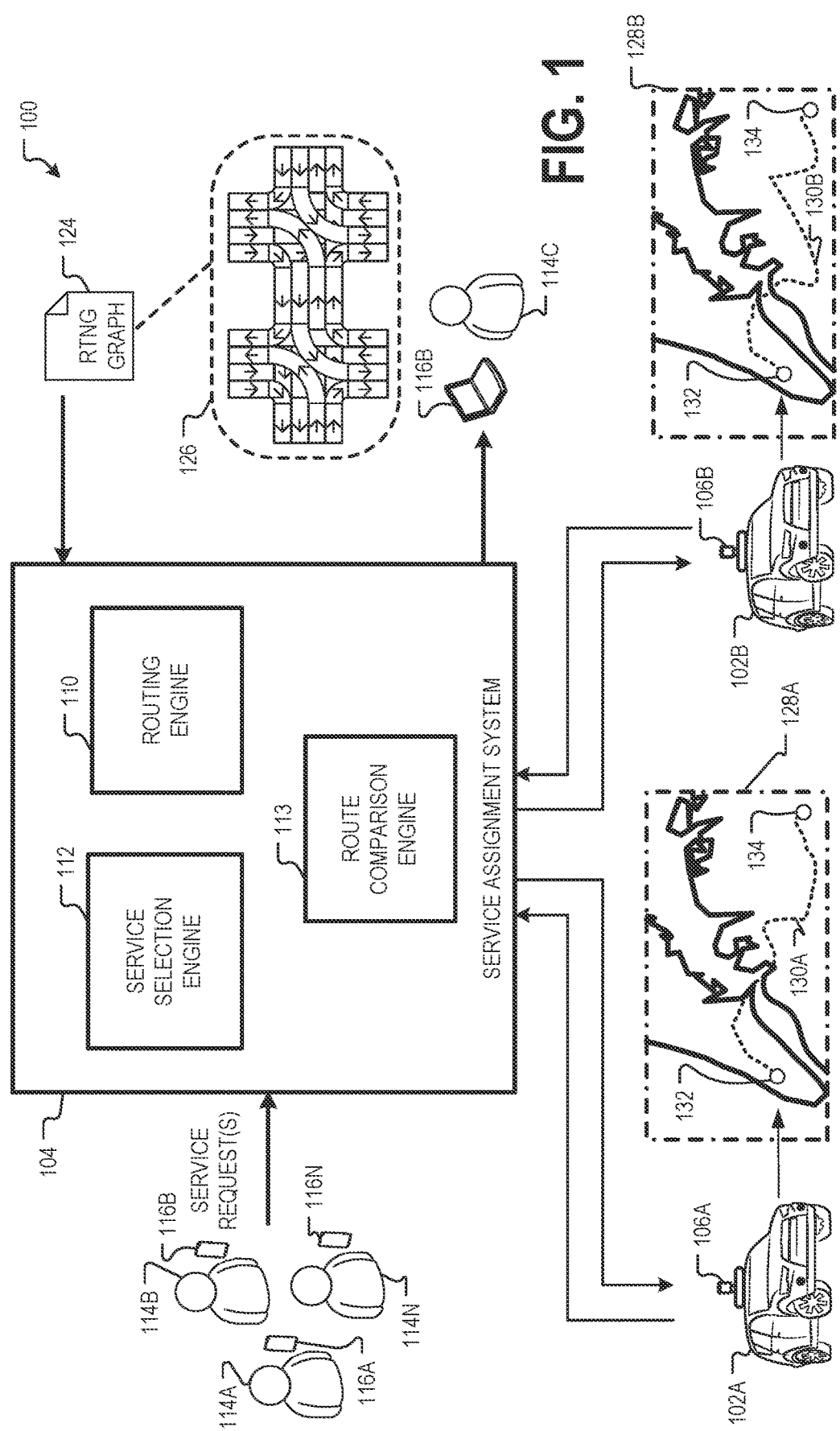
FIG. 1 is a diagram showing one example of an environment for implementing route comparison in conjunction with providing transportation services to one or more users.

Examples described herein are directed to systems and methods for routing autonomous vehicles that includes comparing vehicle routes. Some examples involve comparing routes to support the routing of AVs or other vehicles that execute transportation services. A transportation service includes transporting a payload, such as cargo or one or more passengers, from a service start location to a service end location. Examples of cargo can include food, packages, or the like.

In an AV, a vehicle autonomy system, sometimes referred to as an AV stack, controls one or more of braking, steering, or throttle of the vehicle. In a fully autonomous vehicle, the vehicle autonomy system assumes full control of the vehicle. In a semi-autonomous vehicle, the vehicle autonomy system assumes a portion of the vehicle control, with a human user (e.g., a vehicle operator) still providing some control input. Some autonomous vehicles can also operate in a manual mode, in which a human user provides all control inputs to the vehicle.

Assigning transportation services to AVs creates problems that may not be encountered with human-operated vehicles. For example, different AVs having different capabilities may be routed differently. Some AVs may deliberately route around roadway features such as, for example, unprotected left turns, while other types of AVs may not. Also, different types of AVs may have different policies about whether or when to traverse potentially sensitive roadway elements, such as those in school zones, parks, and so forth. This makes it more likely that the service assignment system will need to select from among AVs that will use different routes to execute the same transportation service. Accordingly, it may be desirable for the service assignment system to generate a qualitative and/or quantitative indication of the difference between two routes.

There are various different circumstances in which it is desirable for a service assignment system managing AVs or other vehicles to compare routes. For example, if the service assignment system assigns a transportation service to a vehicle and asks the vehicle to execute the service according to an assigned route, it may be desirable for the service assignment system to compare the assigned route to an actual route traveled by the vehicle to determine compliance.

Also, in some examples, the service assignment system may provide a vehicle with a system-proposed route for executing a transportation service. The vehicle may reply with a vehicle-proposed route. It may be desirable for the service assignment system to compare the system-proposed route with the vehicle-proposed route. Based on the comparison, the service assignment system accepts or rejects the vehicle-proposed route. Also, in some examples, the comparison is performed by the vehicle to determine whether to accept the system-proposed route.

In other examples, the service assignment system may utilize route comparison to screen routes generated by a service assignment system routing engine and/or a routing engine on a vehicle. For example, routes may be generated to optimize the estimated time of arrival (ETA) for a transportation service, where ETA indicates the time at which the vehicle completes the transportation service. A route generated to optimize ETA, however, may not be optimized for other factors such as, for example, total distance traveled. A route that is optimized for ETA but not for total distance traveled may cause distress to some customers who, for example, may feel that the vehicle is going out of its way and may, therefore, be less favorably inclined to use the service assignment system. In some examples, a route comparison may be used to compare a route optimized for ETA to a route optimized for a shortest distance traveled. If the difference is too great, the service assignment system may take a remedial action such as, for example, generating another route for the service.

When routing AVs and/or other vehicles, however, comparing two routes may not be straightforward. For example, a route may be described by route data including a set of ordered vehicle positions. Simply comparing the vehicle positions describing one route with the vehicle positions describing another route often fails to provide a meaningful result. That is because the vehicle positions describing one route may not have any meaningful relationship to the vehicle positions describing making up another route. For example, different routing engines may describe even very similar routes with completely different sets of vehicle positions at different intervals along the routes. Also, different vehicles may measure their vehicle position at different intervals, again leading to different sets of vehicle positions even for very similar routes. Similar issues also arise when route data captured by a vehicle is compared to route data generated by a routing engine.

Various examples described herein address these and other issues by comparing routes using normalized route data. A route comparison engine may access route data for two (or at least two) routes. The route comparison engine determines reference positions for a first route and a second route of the at least two routes. The reference positions can be, for example, end positions of the routes. In some examples, where the routes end at the same location, the routes may have a common end position. In other examples, the reference positions can be points on the first and second routes that overlap and/or our close to one another.

The route comparison engine uses the reference positions from the first and second routes to generate first normalized route data describing the first route and second normalized route data describing the second route. To generate the first normalized route data, the route comparison engine selects a first normalized position that is a first distance from the first reference position along the first route in a first direction. For example, the route comparison engine may find the first normalized position by traversing the first route from the first reference position in the first direction for the first distance.

The route comparison engine may select a second normalized position that is the first distance from the first normalized position along the first route in the first direction. For example, the route comparison engine may find the second normalized position by traversing the first route from the first normalized position in the first direction for the first distance. A third normalized position may be selected that is the first distance from the second normalized position along the first route in the first direction. A fourth normalized position may be selected in a similar manner and additional normalized positions may be selected until a termination of the first route is determined. A plurality of normalized positions as described may make up first normalized route data describing the first route. The second route may also be normalized in a similar manner to generate second normalized route data.

The first normalized route data describing the first route and the second normalized route data describing the second route data may include corresponding normalized position. For example, a first normalized position from the first normalized route data that is a first distance from the first route reference position may be compared to a corresponding first normalized position from the second normalized route data that is the first distance from a second route reference position.

One or more sets of corresponding normalized positions from the first and second routes may be compared. The result of the comparison can include a qualitative and/or a quantitative indication of the similarity of the first route and the second route. For example, if all or a threshold portion of the sets of corresponding normalized positions from the first and second routes are within a threshold distance of one another, then the first and second routes may be considered equivalent. In another example, the route comparison engine may aggregate measured distances between one or more of the sets of corresponding normalized positions. For example, the route comparison engine may take a sum, average, median, or other suitable aggregation of the distances where the aggregation provides a quantitative measure of the difference between the first route and the second route.

FIG. 1 is a diagram showing one example of an environment 100 for implementing route comparison in conjunction with providing transportation services to one or more users 114A, 114B, 114N. For example, the environment 100 may be configured to assign transportation services to AVs considering planned route prediction. The environment 100 includes a service assignment system 104 and AVs 102A, 102B. The AVs 102A, 102B can include passenger vehicles, such as trucks, cars, buses, or other similar vehicles. The AVs 102A, 102B can also include delivery vehicles, such as vans, trucks, tractor trailers, etc. Although FIG. 1 shows two AVs 102A, 102B, any suitable number of vehicles may be used. Also, although FIG. 1 shows two AVs 102A, 102B, the route comparison techniques described herein, in some examples, can be performed on routes that were executed or can be executed by semi-autonomous or non-autonomous (e.g., manual) vehicles.

Figure 3:
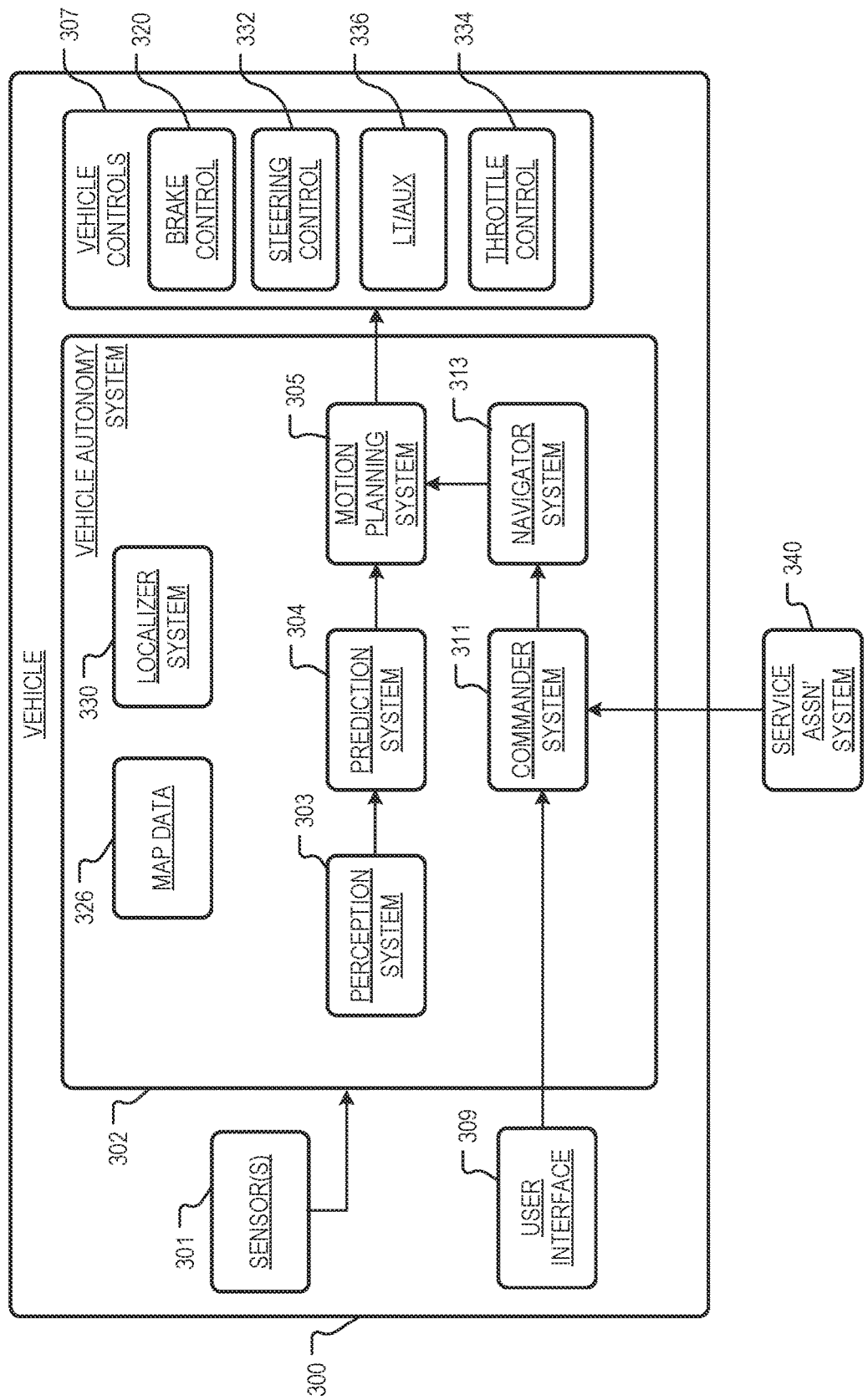
FIG. 3 depicts a block diagram of an example vehicle according to example aspects of the present disclosure.

Each of the AVs 102A, 102B includes a vehicle autonomy system, described in more detail with respect to FIG. 3. The vehicle autonomy system is configured to operate some or all of the controls of the AV 102A, 102B (e.g., acceleration, braking, steering). In some examples, one or more of the AVs 102A, 102B are operable in different modes, where the vehicle autonomy system has differing levels of control over the AV 102A, 102B. Some AVs 102A, 102B may be operable in a fully autonomous mode in which the vehicle autonomy system has responsibility for all or most of the controls of the AV 102A, 102B. Some AVs 102A, 102B are operable in a semiautonomous mode that is in addition to or instead of the fully autonomous mode. In a semiautonomous mode, the vehicle autonomy system of an AV 102A, 102B is responsible for some of the vehicle controls while a human user or driver is responsible for other vehicle controls. In some examples, one or more of the AVs 102A, 102B are operable in a manual mode in which the human user is responsible for all control of the AV 102A, 102B.

The AVs 102A, 102B include one or more remote-detection sensor sets 106A, 106B, 106N. The remote-detection sensor sets 106A, 106B, 106N include one or more remote-detection sensors that receive signals from the environment 100. The signals may be emitted by and/or reflected from objects in the environment 100, such as the ground, buildings, trees, etc. The remote-detection sensor sets 106A, 106B, 106N may include one or more active sensors, such as light imaging detection and ranging (LIDAR) sensors, radio detection and ranging (RADAR) sensors, and/or sound navigation and ranging (SONAR) sensors, that emit sound or electromagnetic radiation in the form of light or radio waves to generate return signals. Information about the environment 100 is extracted from the received signals. In some examples, the remote-detection sensor sets 106A, 106B, 106N include one or more passive sensors that receive signals that originated from other sources of sound or electromagnetic radiation. The remote-detection sensor sets 106A, 106B, 106N provide remote-detection sensor data that describes the environment 100. The AVs 102A, 102B can also include other types of sensors, for example, as described in more detail with respect to FIG. 3.

The AVs 102A, 102B may be of different types. Different types of AVs may have different capabilities. For example, the different types of AVs 102A, 102B can have different vehicle autonomy systems. This can include, for example, vehicle autonomy systems made by different manufacturers or designers, vehicle autonomy systems having different software versions or revisions, etc. Also, in some examples, the different types of AVs 102A, 102B can have different remote-detection sensor sets 106A, 106B. For example, one type of AV 102A, 102B may include a LIDAR remote-detection sensor, while another type of AV 102A, 102B may include stereoscopic cameras and omit a LIDAR remote-detection sensor. In some examples, different types of AVs 102A, 102B can also have different mechanical particulars. For example, one type of vehicle may have all-wheel drive, while another type may have front-wheel drive, etc.

The service assignment system 104 is programmed to assign transportation services to the AVs 102A, 102B as described herein. The service assignment system 104 can be or include one or more servers or other suitable computing devices. The service assignment system 104 is configured to receive transportation service requests from one or more users 114A, 114B, 114N. The users 114A, 114B, 114N make transportation service requests with user computing devices 116A, 116B, 116N. The user computing devices 116A, 116B, 116N can be or include any suitable computing device such as, for example, tablet computers, mobile telephone devices, laptop computers, desktop computers, etc. In some examples, the user computing devices 116A, 116B, 116N execute an application associated with a transportation service implemented with the service assignment system 104. The users 114A, 114B, 114N launch the application on the respective user computing devices 116A, 116B, 116N and utilize functionality of the application to make transportation service requests.

The service assignment system 104 comprises a service selection engine 112, a routing engine 110, and a route comparison engine 113. The service selection engine 112 is programmed to receive and process transportation service requests. Upon receiving a transportation service request, the service selection engine 112 may select a set of candidate vehicles for executing the transportation service. In the example of FIG. 1, the set of candidate vehicles includes the AV 102A and the AV 102B. The set of candidate vehicles for a requested transportation service may include vehicles that are best suited for executing the transportation service such as, for example, vehicles that are near to a start position of the transportation service and are capable of executing the transportation service. For example, a transportation service that involves moving a large cargo object may be executable only by vehicles having sufficient space to carry the large object. A transportation service that involves moving, for example, five passengers may be executable only by vehicles having sufficient space to carry five passengers.

The routing engine 110 may be used to generate routes for the one or more of the AVs 102A, 102B to execute a requested transportation service. For example, the service selection engine 112 may provide the routing engine 110 with an indication of one or more candidate AVs 102A, 102B. The predicted route for an AV 102A, 102B may begin at a current location of a candidate AV 102A, 102B and extend to the transportation service start location and transportation service end location. If the transportation service includes one or more waypoints, the predicted route will also pass these waypoints. In the example of FIG. 1, service assignment system 104 has received a transportation service request describing a service start position 132 and a service end position 134. The routing engine 110 has generated a route 130A for the AV 102A to execute the transportation service and a route 130B for the AV 102B to execute the transportation service, as shown by break-out maps 128A, 128B.

In some examples, the service assignment system 104 provides the routes 130A, 130B to the AVs 102A, 102B. For example, the service assignment system 104 may request confirmation from the AVs 102A, 102B that they can execute the routes 130A, 130B. In some examples, one or both of the AVs 102A, 102B may provide alternate routes that the AVs 102A, 102B intend to execute instead of the routes 130A, 103B provided by the system 104. The alternate routes may be generated by routing engines associated with the respective AVs 102A, 102B such as, for example, onboard routing engines or external routing engines not associated with service assignment system. In some examples, when an AV 102A, 10B executes a route, it provides the service assignment system 104 with actual route data generated by the AVs position sensor or sensors while the AV 102A, 102B executes the route.

Referring back to the service assignment system 104, the routing engine 110 generates routes using a routing graph 124. The routing graph 124 is a representation of the roadways in a geographic area. The routing graph 124 represents the roadways as a set of graph elements. A graph element is a component of a routing graph 124 that represents a roadway element on which the autonomous vehicle can travel. A graph element can be or include an edge, node, or other component of a routing graph. A graph element represents a portion of roadway, referred to herein as a roadway element. A roadway element is a component of a roadway that can be traversed by a vehicle.

A roadway element may be or include different subdivisions of a roadway, depending on the implementation. In some examples, the roadway elements are or include road segments. A road segment is a portion of roadway including all lanes and directions of travel. Consider a four-lane divided highway. A road segment of the four-lane divided highway includes a stretch of the highway including all four lanes and both directions of travel.

In some examples, roadway elements are or include directed road segments. A directed road segment is a portion of roadway where traffic travels in a common direction. Referring again to the four-lane divided highway example, a stretch of the highway would include at least two directed road segments: a first directed road segment including the two lanes of travel in one direction and a second directed road segment including the two lanes of travel in the other direction.

In some examples, roadway elements are or include lane segments. A lane segment is a portion of a roadway including one lane of travel in one direction. Referring again to the four-lane divided highway example, a portion of the divided highway may include two lane segments in each direction. Lane segments may be interconnected in the direction of travel and laterally. For example, a vehicle traversing a lane segment may travel in the direction to travel to the next connected lane segment or may make a lane change to move laterally to a different lane segment.

The routing graph 124 indicates data describing directionality and connectivity for the graph elements. The directionality of a graph element describes limitations, if any, on the direction in which a vehicle can traverse the roadway element corresponding to the graph element. The connectivity of a given graph element describes other graph elements to which the autonomous vehicle can be routed from the given graph element.

The routing graph 124 can also include cost data describing costs associated with graph elements. The cost data indicates the cost for a vehicle to traverse a roadway element corresponding to a graph element or to transition between roadway elements corresponding to connected graph elements. Cost can be based on various factors including, for example, estimated driving time, danger risk, etc. In some examples, higher cost generally corresponds to more negative characteristics of a graph element or transition (e.g., longer estimated driving time, higher danger risk). The routing engine 110 generates routes for vehicles by finding a low-cost combination of connected graph elements corresponding to a sequence of roadway elements between two locations.

In FIG. 1, a break-out window 126 shows example roadway elements that can correspond to the graph elements of the routing graph 124. Roadway elements in the break-out window 126 are illustrated as shapes with arrows indicating the directionality of the roadway elements. Roadway elements can be connected to one another according to their directionality.

The routing engine 110, in some examples, utilizes routing graph modification data to generate constrained routing graph data. Routing graph modification data indicates routing graph modifications that are applied to the routing graph 124 to generate a constrained routing graph. A routing graph modification is a change to a routing graph (e.g., a general-purpose routing graph) that reflects various factors including, for example, capabilities of the vehicle that is to execute a route, current roadway conditions, business policy considerations, and so on. A routing graph modification includes a graph element descriptor and a constraint.

A graph element descriptor is data describing one or more graph elements that are the subject of a routing graph modification. For example, a graph element descriptor can describe graph elements using one or more graph element properties. A graph element property is anything that describes a graph element and/or its corresponding roadway element. Example graph element properties include, for example, a unique identifier for the graph element, a roadway type of the corresponding roadway element (e.g., divided highway, urban street), a driving rule of the roadway element associated with the graph element (e.g., speed limit, access limitations), a type of maneuver for entering, exiting, and/or traversing the corresponding roadway element, whether the corresponding roadway element leads to a specific type of roadway element (e.g., dead-end, divided highway), and so on. In some examples, a graph element descriptor including a unique indicator of a particular graph element can be used to generate a routing graph modification that is applied to the particular graph element.

A constraint is an action applied to graph elements, at a routing graph, that are described by the graph element descriptor of a routing graph modification. Example constraints that may be applied to a graph element include removing the graph element from the routing graph, modifying (e.g., removing) transitions to or from a graph element, changing a cost associated with a graph element or transitions involving the graph element, etc. Costs may be changed up or down. For example, if the routing graph modification data indicates that graph elements having a particular graph element property or set of graph element properties are disfavored, the costs to traverse and/or transition to the corresponding roadway elements can be increased. On the other hand, if the routing graph modification data indicates that graph elements having a particular graph element property or set of constraint properties are favored, the costs to traverse and/or transition to the corresponding roadway elements can be decreased.

Another example constraint can include changing a required or recommended autonomous vehicle mode. For example, a graph element can be modified to indicate that an autonomous vehicle traversing the roadway element corresponding to the graph element should be operated in a semi-autonomous or manual mode.

Consider an example in which a routing policy forbids routing a vehicle through roadway elements that include or are in a school zone. A routing graph modification may include graph element descriptor data identifying graph elements that correspond to roadway elements having a school zone. A corresponding constraint includes removing the graph elements corresponding to such school zone roadway elements from the routing graph 124 and/or removing transitions to such school zone roadway elements.

In some examples, a constraint can be applied to graph elements other than those indicated by the graph element descriptor data. Consider an example routing graph modification that is to avoid cul-de-sacs. The associated constraint can involve removing connectivity to graph elements corresponding to cul-de-sac roadway elements and also removing graph elements corresponding to roadway elements that do not include cul-de-sacs but can lead only to other roadway elements that do include cul-de-sacs.

Routing graph modification data can also include routing graph constraints related to vehicle capability. For example, vehicles of different types (e.g., autonomous vehicles, human-driven vehicles, different types of autonomous vehicles) can have different capabilities and, therefore, can be associated with different vehicle-capability-related routing graph modifications. Vehicle capability of an AV 102A, 102B may be and/or be derived from operation domain (OD) and/or operational design domain (ODD) data (also referred to herein as vehicle capability data). The vehicle capability data, if any, may be provided by the vehicle's manufacturer. In some examples, vehicle capability is supplemented based on the performance of an AV 102A, 102B or type of autonomous vehicle in executing transportation services. Routing graph modifications based on vehicle capability can include, for example, routing graph modifications that identify graph elements corresponding to roadway elements that have property or properties (e.g., includes an unprotected left, is part of a controlled access highway) and constraint data indicating what is to be done to route components having the indicated property or properties. The graph elements corresponding to roadway elements that a particular type of AV 102A, 102B is not capable of traversing can be removed from the routing graph or can have connectivity data modified to remove transitions to those graph elements. For example, one or more connections to a graph element may be removed. If the properties of a graph element indicate that it corresponds to a roadway element including a maneuver that is undesirable for a vehicle, but not forbidden, then the routing engine 110 can increase the cost of the graph element and/or transitions thereto.

Other routing graph modifications that can be described by the routing graph modification data may include, for example, policy routing graph modifications and operational routing graph modifications. Policy routing graph modifications include graph element properties that identify roadway elements subject to a policy routing graph modification and corresponding routing graph modifications. Policy routing graph modifications refer to types of roadway elements that are desirable for a vehicle to avoid or prioritize. An example policy routing graph modification is to avoid roadway elements that are in or pass through school zones. Another example policy routing graph modification is to avoid routing vehicles through residential neighborhoods. Yet another example policy routing graph modification is to favor routing vehicles on controlled-access highways, if available. Policy routing graph modifications can apply to some vehicles, some vehicle types, all vehicles, or all vehicle types.

Operational routing graph modifications can be based, for example, on the state of one or more roadways. For example, if a roadway is to be closed for a parade or for construction, an operational routing graph modification identifies properties (e.g., names or locations) of roadway elements that are part of the closure and an associated routing graph modification (e.g., removing the corresponding graph elements, removing transitions to the corresponding graph elements).

In some examples, the routing engine 110 applies routing feature flags. Routing feature flags modify the way that a routing graph, such as a constrained routing graph, is used to generate a route for an AV 102A, 102B. For example, a routing feature flag may describe a type of traversal of the constrained routing graph that is favored or disfavored for an AV 102A, 102B or type of AV.

The route comparison engine 113 may compare the route 130A for the AV 102A and the route 130B for the AV 102B. As described herein, the routes 130A, 130B may be represented by an ordered set of vehicle positions. Each vehicle position can be represented, for example, by a latitude and longitude or according to any other suitable reference frame. Traversing the routes 130A, 130B involves beginning at one vehicle position (e.g., at start position 132), progressing to the next vehicle position, and then to the next vehicle position, and so on. In the example of FIG. 1, the route data describing the routes is generated by the routing engine 110 of the service assignment system 104. In other examples, however, route data describing a route can be generated by other sources. For example, a route (and describing route data) can be generated by a routing engine onboard one of the AVs 102A, 102B and/or by an offboard routing engine that is not a part of the service assignment system.

Also, in some examples, the route comparison engine 113 compares one or more routes that have already been executed by one of the AVs 102A, 102B or another vehicle. For example, the AVs 102A, 102B (or other vehicles) may include a global positioning system (GPS) or other suitable position sensor for capturing vehicle positions. While the AV 102A, 102B is executing a route, its position sensor captures successive vehicle positions to generate route data describing the executed route.

Figure 2:
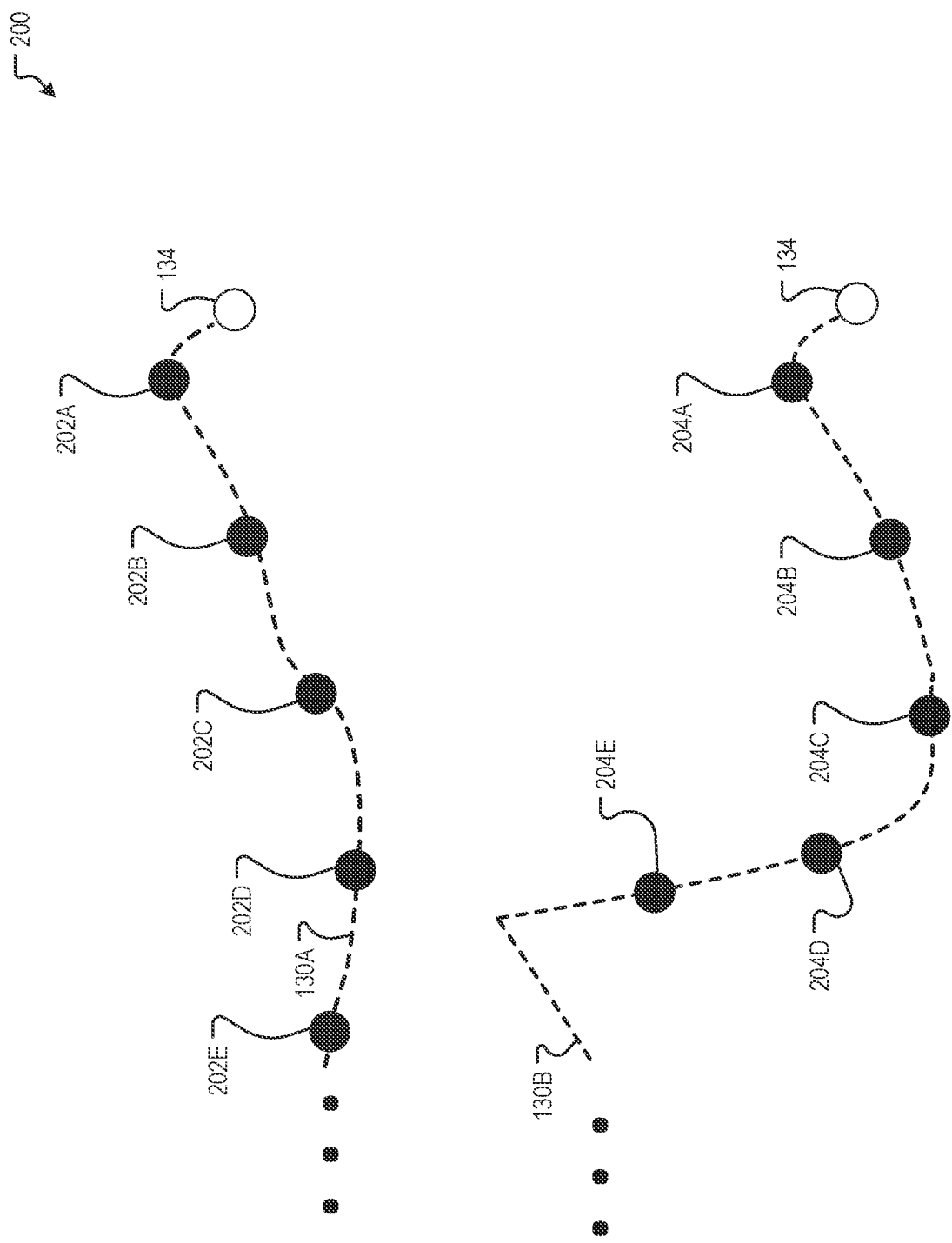
FIG. 2 is a diagram showing segments of two routes to illustrate one way of generating normalized route data.

The route comparison engine 113 may compare two routes, such as the example routes 130A, 130B by generating normalized route data. FIG. 2 is a diagram 200 showing segments of the route 130A and the route 130B to illustrate one way of generating normalized route data. The route comparison engine 113 selects reference position on the routes 130A, 130B. The reference positions are positions on both routes that are close to one another (e.g., within a threshold distance of one another). In the example of FIGS. 1 and 2, the routes 130A, 130B both end at the end position 134 for the transportation service. Accordingly, in this example, the end position 134 is selected at the reference position for both routes. In some examples, the route comparison engine 113 compares the end position of two routes prior to generating normalized route data. If the end positions of the two routes are not within a threshold distance, the route comparison engine 113 may decline to compare the routes.

For the route 130A, the route comparison engine 113 begins at the reference position (e.g., transportation service end position 134) and traverses the route 130A in a first direction (in this example backwards) for a first distance, where the comparison engine selects a normalized position 202A. Accordingly, the normalized position 202A is separated from the reference position along the route 130A by the first distance. The route comparison engine 113 continues to traverse the route 130A in the first direction again for the first distance to select normalized position 202B. Accordingly, normalized position 202B is separated from the normalized position 202A along the route 130A by the first distance. The route comparison engine 113 continues in the same manner to select normalized positions 202C, 202D, 202E and so on until a termination of the route 130A is reached. In this example, where the route 130A is traversed in a backwards direction from the end position 134, the termination of the route 130A is reached at the start position 132.

The route comparison engine 113 generates normalized route data for the route 130B in a similar manner. Beginning at the reference position, the route comparison engine 113 traverses in the first direction (e.g., backwards in this example) along the route 130B for the first distance and selects a normalized position 204A. Accordingly, the normalized position 204A is separated from the reference position (e.g., here the end position 134) along the route 130B by the first distance. The route comparison engine 113 continues in the same manner to select normalized positions 204B, 204C, 204D, 204E, and so on until the termination of the route 130B is reached. In this example, the termination of the route 130B is also reached at the start position 132.

The route comparison engine 113 uses the normalized route data describing the routes 130A, 103B to perform a comparison of the routes. For example, the route comparison engine 113 may compare the positions of corresponding normalized positions. Corresponding normalized positions are normalized positions that are the same distance from the reference position along the respective routes. In the example shown in FIGS. 1 and 2, the normalized position 202A of the route 130A corresponds to the normalized position 204A of the route 130B. Both normalized positions 202A, 204A are separated from their respective reference positions along their respective routes by the first distance. Similarly, normalized position 202B corresponds to normalized position 204B as both are separated from their respective reference positions along their respective routes by the same distance (e.g., 2 times the first distance). In this example, normalized position 202C corresponds to normalized position 204C, normalized position 202D corresponds to normalized position 204D, normalized position 202E corresponds to normalized position 204E and so on.

The route comparison engine 113 utilizes its comparison of corresponding normalized positions to compare the routes 130A, 130B. In some examples, the route comparison engine 113 is configured to generate a qualitative similarity score, for example, to indicate that the routes 130A, 130B are equivalent or not equivalent. In this example, the route comparison engine 113 may determine if the corresponding normalized positions are within a threshold distance of each other. If each pair of corresponding normalized positions are within the threshold distance of one another, then the routes 130A, 130B are determined to be considered equivalent. In another example, if at least a predetermined portion (e.g., 75%, 90%, etc.) of the corresponding normalized positions are within a threshold distance of one another, the routes 130A, 130B are determined to be equivalent.

In other examples, the route comparison engine 113 utilizes its comparison of corresponding normalized positions to generate a quantitative similarity score for the routes 130A, 130B. For example, the similarity score may be or be based on average, median, sum, or any other suitable mathematical aggregation of the distances between the corresponding normalized positions over all or part of the respective routes 130A, 130B.

Distances as described herein, such as the distance between normalized positions or the distance between a normalized position and the reference position, may be measured in any suitable manner. In some examples, distance along a route can be measured utilizing the shortest distance along the route with the route projected onto a plane. This technique may be suitable, for example, for routes that cover a relatively small and flat area.

For other examples, distances may be measured as projected onto a sphere or ellipse. For example, referring again to FIG. 1, the first distance between the reference position (e.g., service end position 134) and the first normalized position 202A may be a spherical geodesic along the route 130A from the position 134 to the position 202A. In other examples, an ellipsoid geodesic may be used. Some examples may determine distances utilizing the S2 Geometry library available from Google, Inc. For example, positions on the respective routes 130A, 130B may be assigned corresponding S2 cells. The distance between two points may be determined by calling a distance function of the S2 library to determine the spherical geodesic between the corresponding S2 cells.

To further illustrate route comparison, consider the following example based on two example routes, referred to as Route A and Route B, given by TABLE 1 below:

TABLE 1

| Route A | Route B |
| --- | --- |
| <1, 0> | <1, 0> |
| <3, 0> | <11, 0> |
| <4, 0> | |
| <11, 0> | |

In this example, Route A and Route B may be aligned to determine that the route end positions for both routes are the same (e.g., <11,1>). Accordingly, the route end position may be selected as the reference position for both routes.

In this simplified example, the first distance is two. The route comparison engine 113 begins with Route A and traverses Route A backwards from the reference position <11,0> by two and selects a first normalized position at <9,0>. The route comparison engine 113 continues to traverse Route A backwards from <9,0> by two and sets a next normalized position at <7,0>. This process continues until the termination of Route A is reached (in this example, <1,0>). The results are given by TABLE 2 below:

TABLE 2

| Normalized Route A |
| --- |
| <1, 0> |
| <3, 0> |
| <5, 0> |
| <7, 0> |

TABLE 2-continued

| Normalized Route A |
| --- |
| <9, 0> |
| <11, 0> |

A similar process may be performed to generate normalized Route B, as given by TABLE 3 below:

TABLE 3

| Normalized Route B |
| --- |
| <1, 0> |
| <3, 0> |
| <5, 0> |
| <7, 0> |
| <9, 0> |
| <11, 0> |

In this example, Route A and Route B are equivalent, as the distances between the corresponding normalized positions is zero.

Results of the route comparison engine 113 may be provided to the service selection engine 112, which may utilize the results to select a vehicle, such as one of the AVs 102A, 102B to execute a transportation service. For example, if the routes 130A, 130B are equivalent or have a quantitative similarity score within a threshold amount, the service selection engine 112 may determine which AV 102A, 102B will be assigned the transportation service based on other factors.

Consider another example in which a transportation service is assigned to the AV 102A. The routing engine 110 may generate a proposed route to be executed by the AV 102A to execute the transportation service. The AV 102A may also generate actual route data describing the actual route that it took to execute the transportation service (e.g., using one or more position sensors). The AV 102A may provide the actual route data to the service assignment system 104. The service assignment system 104 may utilize the route comparison engine 113 to compare the actual route data to proposed route data describing the proposed route. Differences between the proposed route and the actual route may be used to assign subsequent transportation services. For example, if the AV 102A deviated significantly from the proposed route, then then the service assignment system 104 may reevaluate the policies and/or vehicle capabilities for the AV 102A or AVs of the same type to generate better proposed routes in the future. In other examples, the service assignment system 104 may disfavor the AV 102A and/or AVs of the same type for failing to adhere to the proposed route.

Consider an example in which the routing engine 110 (or another routing engine associated with an AV 102A, 102B) generates two proposed routes. A first proposed route may be generated to optimize ETA for a transportation service (e.g., optimized to complete the transportation service in the shortest amount of time). A second proposed route may be generated to optimize total distance traveled. The service assignment system 104 may compare the first proposed route and the second proposed route. If the determined difference is greater than a threshold, then the service assignment system 104 may generate a third proposed route for the transportation service, where the third proposed route is to optimize ETA and distance traveled.

Consider another example in which the service assignment system 104 is capable of pooling transportation services. For example, a single vehicle, such as a single AV 102A, 102B may execute more than one transportation service at the same time. For example, the vehicle may proceed to the start position for one service to pick up a first service payload. The vehicle may then proceed to the start location for another service to pick up a second service payload. The first and second service payloads may be dropped off at their respective service end positions. In some examples, the route comparison engine 113 is used to identify transportation services that may be pooled efficiently. For example, the routing engine 110 may generate proposed routes for service requests received from the users 114A, 114B, 114N. The route comparison engine 113 may compare the proposed routes. Groups of transportation services having proposed routes that have differences less than a threshold value may be candidates for pooling for execution by a single vehicle.

Consider another example in which the service assignment system 104 provides an AV 102A, 102B with a proposed route for executing a transportation service. The AV 102A, 102B replies with its own proposed route. In some examples, the route comparison engine 113 compares the service assignment system proposed route to the vehicle proposed route. If the difference is less than a threshold, the service assignment system 104 assigns the transportation service to the AV 102A, 102B. If the difference is greater than a threshold, the service assignment system 104 assigns the transportation service to a different vehicle.

FIG. 3 depicts a block diagram of an example vehicle 300 according to example aspects of the present disclosure. The vehicle 300 includes one or more sensors 301, a vehicle autonomy system 302, and one or more vehicle controls 307. The vehicle 300 is an autonomous vehicle, as described herein. The example vehicle 300 shows just one example arrangement of an autonomous vehicle. In some examples, autonomous vehicles of different types can have different arrangements.

The vehicle autonomy system 302 includes a commander system 311, a navigator system 313, a perception system 303, a prediction system 304, a motion planning system 305, and a localizer system 330 that cooperate in perceiving the surrounding environment of the vehicle 300 and determining a motion plan for controlling the motion of the vehicle 300 accordingly.

The vehicle autonomy system 302 is engaged to control the vehicle 300 or to assist in controlling the vehicle 300. In particular, the vehicle autonomy system 302 receives sensor data from the one or more sensors 301, attempts to comprehend the environment surrounding the vehicle 300 by performing various processing techniques on data collected by the sensors 301, and generates an appropriate route through the environment. The vehicle autonomy system 302 sends commands to control the one or more vehicle controls 307 to operate the vehicle 300 according to the route.

Various portions of the vehicle autonomy system 302 receive sensor data from the one or more sensors 301. For example, the sensors 301 may include remote-detection sensors as well as motion sensors such as an inertial measurement unit (IMU), one or more encoders, or one or more odometers. The sensor data includes information that describes the location of objects within the surrounding environment of the vehicle 300, information that describes the motion of the vehicle 300, etc.

The sensors 301 may also include one or more remote-detection sensors or sensor systems, such as a LIDAR system, a RADAR system, one or more cameras, etc. As one example, a LIDAR system of the one or more sensors 301 generates sensor data (e.g., remote-detection sensor data) that includes the location (e.g., in three-dimensional space relative to the LIDAR system) of a number of points that correspond to objects that have reflected a ranging laser. For example, the LIDAR system measures distances by measuring the Time of Flight (TOF) that it takes a short laser pulse to travel from the sensor to an object and back, calculating the distance from the known speed of light.

As another example, a RADAR system of the one or more sensors 301 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system reflect off an object and return to a receiver of the RADAR system, giving information about the object's location and speed. Thus, a RADAR system provides useful information about the current speed of an object.

As yet another example, one or more cameras of the one or more sensors 301 may generate sensor data (e.g., remote-detection sensor data) including still or moving images. Various processing techniques (e.g., range imaging techniques such as structure from motion, structured light, stereo triangulation, and/or other techniques) can be performed to identify the location (e.g., in three-dimensional space relative to the one or more cameras) of a number of points that correspond to objects that are depicted in an image or images captured by the one or more cameras. Other sensor systems can identify the location of points that correspond to objects as well.

As another example, the one or more sensors 301 can include a positioning system. The positioning system determines a current position of the vehicle 300. The positioning system can be any device or circuitry for analyzing the position of the vehicle 300. For example, the positioning system can determine a position by using one or more of inertial sensors, a satellite positioning system such as the Global Positioning System (GPS), a positioning system based on IP address, triangulation and/or proximity to network access points or other network components (e.g., cellular towers, Wi-Fi access points), and/or other suitable techniques. The position of the vehicle 300 can be used by various systems of the vehicle autonomy system 302.

Thus, the one or more sensors 301 are used to collect sensor data that includes information that describes the location (e.g., in three-dimensional space relative to the vehicle 300) of points that correspond to objects within the surrounding environment of the vehicle 300. In some implementations, the sensors 301 can be positioned at different locations on the vehicle 300. As an example, in some implementations, one or more cameras and/or LIDAR sensors can be located in a pod or other structure that is mounted on a roof of the vehicle 300, while one or more RADAR sensors can be located in or behind the front and/or rear bumper(s) or body panel(s) of the vehicle 300. As another example, one or more cameras can be located at the front or rear bumper(s) of the vehicle 300. Other locations can be used as well.

The localizer system 330 receives some or all of the sensor data from the sensors 301 and generates vehicle poses for the vehicle 300. A vehicle pose describes a position and attitude of the vehicle 300. The vehicle pose (or portions thereof) can be used by various other components of the vehicle autonomy system 302 including, for example, the perception system 303, the prediction system 304, the motion planning system 305, and the navigator system 313.

The position of the vehicle 300 is a point in a three-dimensional space. In some examples, the position is described by values for a set of Cartesian coordinates, although any other suitable coordinate system may be used. The attitude of the vehicle 300 generally describes the way in which the vehicle 300 is oriented at its position. In some examples, attitude is described by a yaw about the vertical axis, a pitch about a first horizontal axis, and a roll about a second horizontal axis. In some examples, the localizer system 330 generates vehicle poses periodically (e.g., every second, every half second). The localizer system 330 appends time stamps to vehicle poses, where the time stamp for a pose indicates the point in time that is described by the pose. The localizer system 330 generates vehicle poses by comparing sensor data (e.g., remote-detection sensor data) to map data 326 describing the surrounding environment of the vehicle 300.

In some examples, the localizer system 330 includes one or more pose estimators and a pose filter. Pose estimators generate pose estimates by comparing remote-detection sensor data (e.g., LIDAR, RADAR) to map data. The pose filter receives pose estimates from the one or more pose estimators as well as other sensor data such as, for example, motion sensor data from an IMU, encoder, or odometer. In some examples, the pose filter executes a Kalman filter or machine learning algorithm to combine pose estimates from the one or more pose estimators with motion sensor data to generate vehicle poses. In some examples, pose estimators generate pose estimates at a frequency less than the frequency at which the localizer system 330 generates vehicle poses. Accordingly, the pose filter generates some vehicle poses by extrapolating from a previous pose estimate utilizing motion sensor data.

Vehicle poses and/or vehicle positions generated by the localizer system 330 are provided to various other components of the vehicle autonomy system 302. For example, the commander system 311 may utilize a vehicle position to determine whether to respond to a call from a service assignment system 340.

The commander system 311 determines a set of one or more target locations that are used for routing the vehicle 300. The target locations are determined based on user input received via a user interface 309 of the vehicle 300. The user interface 309 may include and/or use any suitable input/output device or devices. In some examples, the commander system 311 determines the one or more target locations considering data received from the service assignment system 340. The service assignment system 340 is programmed to provide instructions to multiple vehicles, for example, as part of a fleet of vehicles for moving passengers and/or cargo. Data from the service assignment system 340 can be provided via a wireless network, for example.

The navigator system 313 receives one or more target locations from the commander system 311 and map data 326. The map data 326, for example, provides detailed information about the surrounding environment of the vehicle 300. The map data 326 provides information regarding identity and location of different roadways and roadway elements. A roadway is a place where the vehicle 300 can drive and may include, for example, a road, a street, a highway, a lane, a parking lot, or a driveway. Routing graph data is a type of map data 326.

From the one or more target locations and the map data 326, the navigator system 313 generates route data describing a route for the vehicle 300 to take to arrive at the one or more target locations. In some implementations, the navigator system 313 determines route data using one or more path-planning algorithms based on costs for graph elements/corresponding roadway elements, as described herein. For example, a cost for a route can indicate a time of travel, risk of danger, or other factor associated with adhering to a particular proposed route. Route data describing a route is provided to the motion planning system 305, which commands the vehicle controls 307 to implement the route or route extension, as described herein. The navigator system 313 can generate routes as described herein using a general-purpose routing graph and routing graph modification data. Also, in examples where route data is received from the service assignment system 340, that route data can also be provided to the motion planning system 305.

The perception system 303 detects objects in the surrounding environment of the vehicle 300 based on sensor 301 data, the map data 326, and/or vehicle poses provided by the localizer system 330. For example, the map data 326 used by the perception system 303 describes roadways and segments thereof and may also describe buildings or other items or objects (e.g., lampposts, crosswalks, curbing); location and directions of traffic lanes or lane segments (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the vehicle autonomy system 302 in comprehending and perceiving its surrounding environment and its relationship thereto.

In some examples, the perception system 303 determines state data for one or more of the objects in the surrounding environment of the vehicle 300. State data describes a current state of an object (also referred to as a feature of the object). The state data for each object describes, for example, an estimate of the object's current location (also referred to as position); current speed (also referred to as velocity); current acceleration; current heading; current orientation; size/shape/footprint (e.g., as represented by a bounding shape such as a bounding polygon or polyhedron); type/class (e.g., vehicle, pedestrian, bicycle, or other); yaw rate; distance from the vehicle 300; minimum path to interaction with the vehicle 300; minimum time duration to interaction with the vehicle 300; and/or other state information.

In some implementations, the perception system 303 determines state data for each object over a number of iterations. In particular, the perception system 303 updates the state data for each object at each iteration. Thus, the perception system 303 detects and tracks objects, such as other vehicles, that are proximate to the vehicle 300 over time.

The prediction system 304 is configured to predict one or more future positions for an object or objects in the environment surrounding the vehicle 300 (e.g., an object or objects detected by the perception system 303). The prediction system 304 generates prediction data associated with one or more of the objects detected by the perception system 303. In some examples, the prediction system 304 generates prediction data describing each of the respective objects detected by the perception system 303.

Prediction data for an object is indicative of one or more predicted future locations of the object. For example, the prediction system 304 may predict where the object will be located within the next 5 seconds, 30 seconds, 300 seconds, etc. Prediction data for an object may indicate a predicted trajectory (e.g., predicted path) for the object within the surrounding environment of the vehicle 300. For example, the predicted trajectory (e.g., path) can indicate a path along which the respective object is predicted to travel over time (and/or the speed at which the object is predicted to travel along the predicted path). The prediction system 304 generates prediction data for an object, for example, based on state data generated by the perception system 303. In some examples, the prediction system 304 also considers one or more vehicle poses generated by the localizer system 330 and/or map data 326.

In some examples, the prediction system 304 uses state data indicative of an object type or classification to predict a trajectory for the object. As an example, the prediction system 304 can use state data provided by the perception system 303 to determine that a particular object (e.g., an object classified as a vehicle) approaching an intersection and maneuvering into a left-turn lane intends to turn left. In such a situation, the prediction system 304 predicts a trajectory (e.g., path) corresponding to a left turn for the vehicle such that the vehicle turns left at the intersection. Similarly, the prediction system 304 determines predicted trajectories for other objects, such as bicycles, pedestrians, parked vehicles, etc. The prediction system 304 provides the predicted trajectories associated with the object(s) to the motion planning system 305.

In some implementations, the prediction system 304 is a goal-oriented prediction system 304 that generates one or more potential goals, selects one or more of the most likely potential goals, and develops one or more trajectories by which the object can achieve the one or more selected goals. For example, the prediction system 304 can include a scenario generation system that generates and/or scores the one or more goals for an object, and a scenario development system that determines the one or more trajectories by which the object can achieve the goals. In some implementations, the prediction system 304 can include a machine-learned goal-scoring model, a machine-learned trajectory development model, and/or other machine-learned models.

The motion planning system 305 commands the vehicle controls 307 based at least in part on the predicted trajectories associated with the objects within the surrounding environment of the vehicle 300, the state data for the objects provided by the perception system 303, vehicle poses provided by the localizer system 330, the map data 326, and route or route extension data provided by the navigator system 313. Stated differently, given information about the current locations of objects and/or predicted trajectories of objects within the surrounding environment of the vehicle 300, the motion planning system 305 determines control commands for the vehicle 300 that best navigate the vehicle 300 along the route or route extension relative to the objects at such locations and their predicted trajectories on acceptable roadways.

In some implementations, the motion planning system 305 can also evaluate one or more cost functions and/or one or more reward functions for each of one or more candidate control commands or sets of control commands for the vehicle 300. Thus, given information about the current locations and/or predicted future locations/trajectories of objects, the motion planning system 305 can determine a total cost (e.g., a sum of the cost(s) and/or reward(s) provided by the cost function(s) and/or reward function(s)) of adhering to a particular candidate control command or set of control commands. The motion planning system 305 can select or determine a control command or set of control commands for the vehicle 300 based at least in part on the cost function(s) and the reward function(s). For example, the motion plan that minimizes the total cost can be selected or otherwise determined.

In some implementations, the motion planning system 305 can be configured to iteratively update the route or route extension for the vehicle 300 as new sensor data is obtained from the one or more sensors 301. For example, as new sensor data is obtained from the one or more sensors 301, the sensor data can be analyzed by the perception system 303, the prediction system 304, and the motion planning system 305 to determine the motion plan.

The motion planning system 305 can provide control commands to the one or more vehicle controls 307. For example, the one or more vehicle controls 307 can include throttle systems, brake systems, steering systems, and other control systems, each of which can include various vehicle controls (e.g., actuators or other devices that control gas flow, steering, and braking) to control the motion of the vehicle 300. The various vehicle controls 307 can include one or more controllers, control devices, motors, and/or processors.

The vehicle controls 307 include a brake control module 320. The brake control module 320 is configured to receive a braking command and bring about a response by applying (or not applying) the vehicle brakes. In some examples, the brake control module 320 includes a primary system and a secondary system. The primary system receives braking commands and, in response, brakes the vehicle 300. The secondary system may be configured to determine a failure of the primary system to brake the vehicle 300 in response to receiving the braking command.

A steering control system 332 is configured to receive a steering command and bring about a response in the steering mechanism of the vehicle 300. The steering command is provided to a steering system to provide a steering input to steer the vehicle 300.

A lighting/auxiliary control module 336 receives a lighting or auxiliary command. In response, the lighting/auxiliary control module 336 controls a lighting and/or auxiliary system of the vehicle 300. Controlling a lighting system may include, for example, turning on, turning off, or otherwise modulating headlights, parking lights, running lights, etc. Controlling an auxiliary system may include, for example, modulating windshield wipers, a defroster, etc.

A throttle control system 334 is configured to receive a throttle command and bring about a response in the engine speed or other throttle mechanism of the vehicle. For example, the throttle control system 334 can instruct an engine and/or engine controller, or other propulsion system component, to control the engine or other propulsion system of the vehicle 300 to accelerate, decelerate, or remain at its current speed.

Each of the perception system 303, the prediction system 304, the motion planning system 305, the commander system 311, the navigator system 313, and the localizer system 330 can be included in or otherwise be a part of the vehicle autonomy system 302 configured to control the vehicle 300 based at least in part on data obtained from the one or more sensors 301. For example, data obtained by the one or more sensors 301 can be analyzed by each of the perception system 303, the prediction system 304, and the motion planning system 305 in a consecutive fashion in order to control the vehicle 300. While FIG. 3 depicts elements suitable for use in a vehicle autonomy system according to example aspects of the present disclosure, one of ordinary skill in the art will recognize that other vehicle autonomy systems can be configured to control an autonomous vehicle based on sensor data.

The vehicle autonomy system 302 includes one or more computing devices, which may implement all or parts of the perception system 303, the prediction system 304, the motion planning system 305, and/or the localizer system 330. Descriptions of hardware and software configurations for computing devices to implement the vehicle autonomy system 302 and/or the service assignment system 104 of FIG. 1 are provided herein with reference to FIGS. 6 and 7.

Figure 4:
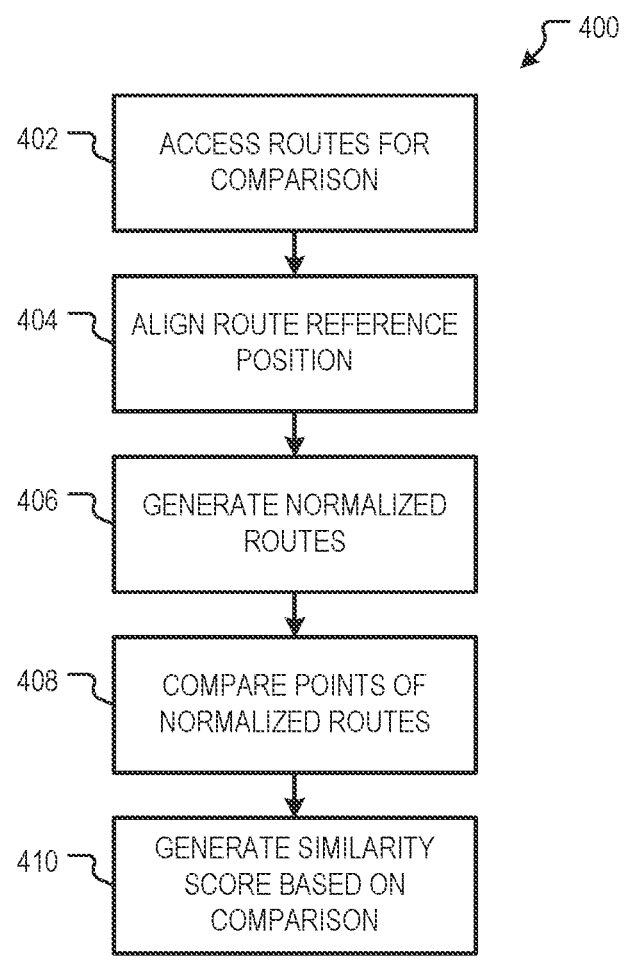
FIG. 4 is a flowchart showing one example of a process flow that may be executed to compare one or more routes.

FIG. 4 is a flowchart showing one example of a process flow 400 that may be executed to compare one or more routes. The process flow 400 may be executed by the route comparison engine 113 or other suitable component (e.g., one or more of the AVs 102A, 102B) to compare at least two routes. At operation 402, the route comparison engine 113 accesses route data describing the at least two routes for comparison.

At operation 404, the route comparison engine 113 aligns reference positions for the routes to be compared. This may include, for example, selecting reference positions for the routes to be compared. In some examples, as described herein, the reference positions are the respective ends fo the routes. In other examples, the reference positions may be positions on the two or more routes that are close to one another, as described herein.

At operation 406, the route comparison engine 113 generates normalized routes. In some examples, a normalized route may be determined for each route that is to be compared. For example, if three routes are to be compared, the route comparison engine 113 may generate a normalized route for the first route, a normalized route for the second route, and a normalized route for the third route. Normalized routes may be generated as described herein, for example, with respect to FIGS. 5 and 6.

At operation 408, the route comparison engine 113 compares points of the normalized routes as described herein. At operation 410, the route comparison engine 113 generates a similarity score for the at least two routes considered. In some examples, the similarity score may be or be based on average, median, sum, or any other suitable mathematical aggregation of the distances between the corresponding normalized positions over all or part of the routes, as described herein.

Figure 5:
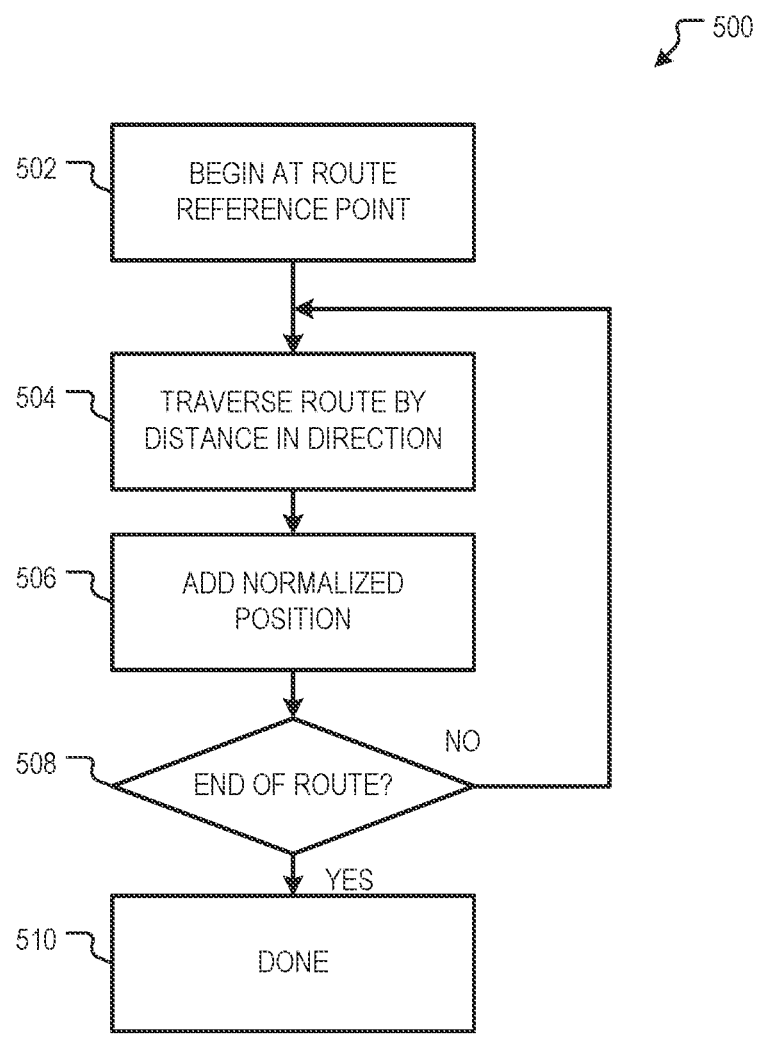
FIG. 5 is a flowchart showing one example of a flowchart that may be executed to generate a normalized route from a reference position.

FIG. 5 is a flowchart showing one example of a process flow 500 that may be executed to generate a normalized route from a reference position. The process flow 500 is one example way for executing operation 406 of the process flow 400. For example, the process flow 500 may be executed once for each route that is to be compared, resulting in a corresponding normalized route for each of the at least two routes to be compared. Process flow 500 shows an arrangement in which a normalized route is generated by traversing the route in a single direction. For example, the process flow 500 may be executed in examples where the reference position is the start position or end position for the route.

At operation 502, the route comparison engine 113 may begin at a reference position on the route. In some examples, the the process flow 500 may be used in instances where the reference position is at the start position or the end position for the route. At operation 504, the route comparison engine 113 traverses the route in a first direction by a first distance. For example, if the reference position is at the route start position, the first direction may be from the route start position towards the route end position (e.g., the direction of travel on the route). If the reference position is at the route end position, the first direction may be from the route end position towards the route start position (e.g., opposite to the direction of travel on the route).

Upon traversing the route in the first direction by the first distance, the comparison engine 113 may add or generate a normalized position. Generating the normalized position may include storing an indication of the normalized position at a persistency of the route comparison engine 113. At operation 508, the route comparison engine 113 determines whether the traversal has covered the entire route (e.g., if the traversal has progressed to or past the termination of the route). If the the traversal has covered the entire route, the normalized route is completed at operation 510.

In some examples, if the traversal at operation 504 began less than the first distance from the route termination, the route termination itself may be stored as a normalized position. In other examples when the traversal at operation 504 began less than the first distance, the route termination may not be stored as a normalized position.

If the traversal has not covered the entire route, the route comparison engine 113 may return to operation 504 and continue to traverse the route by the first distance in the first direction. For example, the traversal may begin at the previous normalized position. The process flow 500 may continue until the traversing reaches the termination of the route, as described herein.

Figure 6:
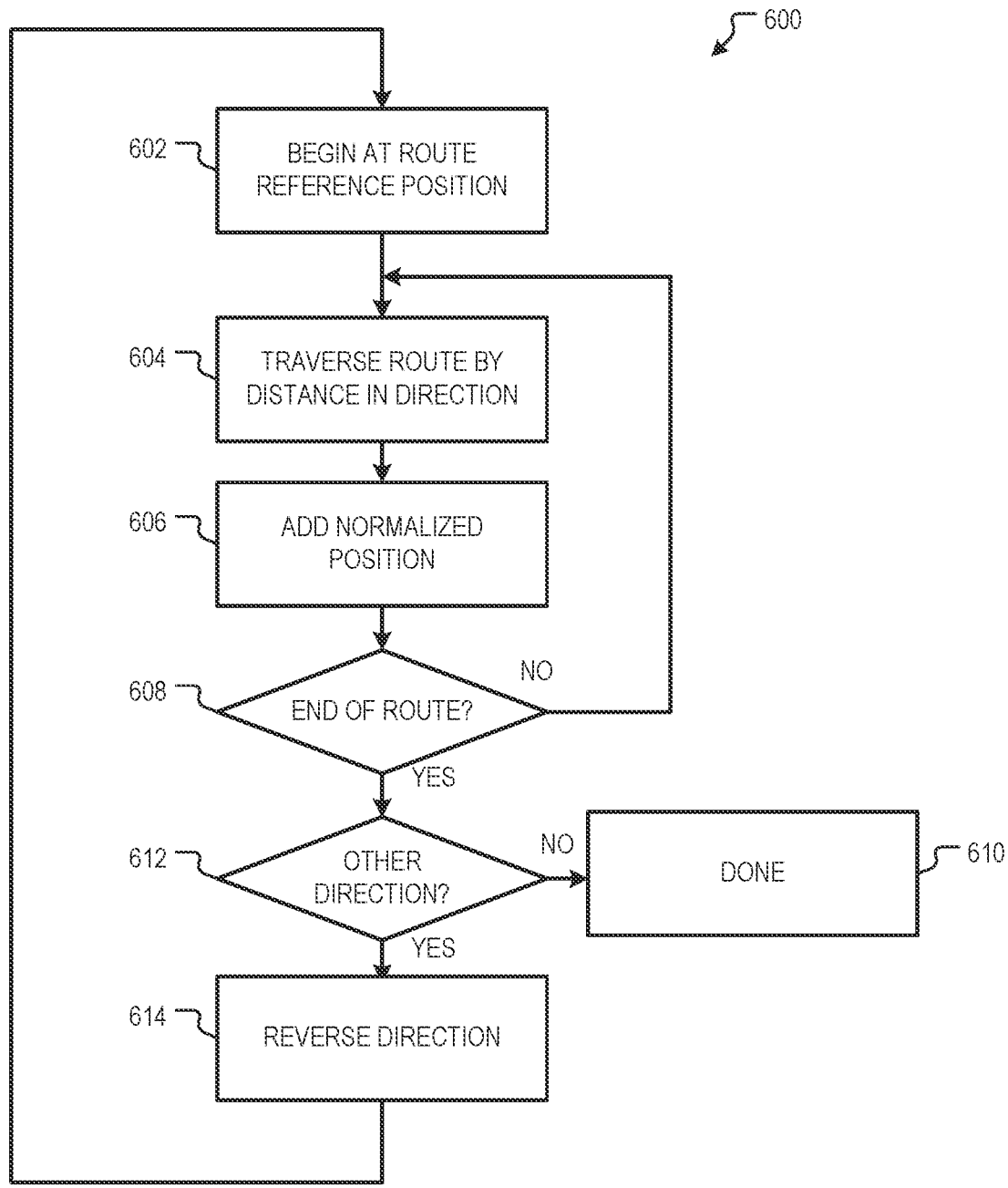
FIG. 6 is a flowchart showing one example of a flowchart that may be executed to generate a normalized route from a reference position.

FIG. 6 is a flowchart showing one example of a process flow 600 that may be executed to generate a normalized route from a reference position. The process flow 600 is another example way for executing operation 406 of the process flow 400. Process flow 600 shows an arrangement in which a normalized route is generated by traversing the route in more than one direction. For example, the process flow 600 may be executed when the reference position is in the middle of a route. For example, the route may be traversed in one direction from the reference position to the start position and then traversed in the other direction from the reference position to the end position or visa versa.

At operation 602, the route comparison engine 113 may begin at a reference position. In the example of FIG. 6, the reference position may not be the start position or end position for the route. At operation 604, the route comparison engine 113 may be traverse the route by the first distance in a first direction. The first direction may be towards the route start position or towards the route end position. At operation 604, the route comparison engine 113 may store an indication of a normalized position, as described herein. At operation 608, the route comparison engine 113 determines whether the most recent traversal at operation 604 has reached a termination of the route (e.g., the route start position if the first direction is towards the route start position or the route end position if the first direction is towards the route end position. If the most recent traversal has not reached the route termination, the route comparison engine 113 may again execute operation 604 and execute another traversal in the first direction by the first distance and store a next normalized position at operation 606.

If, at operation 608, it is determined that the most recent traversal has not reached the termination of the route, the route comparison engine 113 determines, at operation 612, whether the route has already been traversed from the route reference position in a second direction, where the second direction is opposite the first direction. If the route has already been traversed in the second direction, then the normalized route is complete at operation 610. If the route has not already been traversed in the second direction, the route comparison engine 113 may reverse its direction at operation 614 and, at operation 602, begin traversing the route again from the reference position in the second direction.

EXAMPLES

Example 1 is a computer-implemented system for routing an autonomous vehicle, the system comprising: at least one processor unit programmed to perform operations comprising: accessing first route data describing a first route, the first route data comprising a first plurality of ordered vehicle positions from the first route; accessing second route data describing a second route, the second route data comprising a second plurality of ordered vehicle positions from the second route; generating first normalized route data using the first route data, the first normalized route data comprising a first plurality of normalized positions along the first route; generating second normalized route data using the second route data the second normalized route data comprising a second plurality of normalized positions along the second route; comparing a first position from a first plurality of normalized positions with a first corresponding position from the second plurality of normalized positions, the first position being a first distance along the first route from a first route reference position, and the first corresponding position being the first distance along the second route from a second route reference position; and instructing an autonomous vehicle to begin executing an autonomous vehicle route, the instructing based at least in part on the comparing.

In Example 2, the subject matter of Example 1 optionally includes wherein generating the first normalized route data comprises selecting: selecting the first position; and selecting a second position that is the first distance from the first position along the first route, the first position and the second position being described by the first normalized route data.

In Example 3, the subject matter of Example 2 optionally includes wherein the first position is the first distance along the first route from the first route reference position in a first direction, and wherein generating the first normalized route data further comprises selecting a third position that is the first distance from the first route reference position along the first route in a second direction opposite the first direction.

In Example 4, the subject matter of any one or more of Examples 1-3 optionally includes the operations further comprising determining that the first route reference position is within a threshold distance of the second route reference position.

In Example 5, the subject matter of any one or more of Examples 1-4 optionally includes the operations further comprising comparing a second position from the first plurality of normalized positions to a second corresponding position from the second plurality of normalized positions, the second position being a second distance along the first route from the first route reference position, and the second corresponding position being the second distance along the second route from the second route reference position.

In Example 6, the subject matter of Example 5 optionally includes the operations further comprising: determining that the first position is within a threshold distance of the first corresponding position; determining that the second position is within the threshold distance of the second corresponding position; and returning an indication that the first route and the second route are equivalent.

In Example 7, the subject matter of Example 6 optionally includes the operations further comprising: determining a similarity score for the first route and the second route, the similarity score based at least in part on a distance between the first position and the first corresponding position and at least in part on a distance between the second position and the second corresponding position.

In Example 8, the subject matter of any one or more of Examples 1-7 optionally includes the operations further comprising: determining that a second position of the first plurality of normalized positions is not within a threshold distance of a second corresponding position of the second plurality of normalized positions; and returning an indication that the first route and the second route are not equivalent.

In Example 9, the subject matter of any one or more of Examples 1-8 optionally includes wherein the first position is the first distance along the first route from a first route reference position along a spherical geodesic.

Example 10 is a computer-implemented method for routing an autonomous vehicle, the method comprising: accessing first route data describing a first route, the first route data comprising a first plurality of ordered vehicle positions from the first route; accessing second route data describing a second route, the second route data comprising a second plurality of ordered vehicle positions from the second route; generating first normalized route data using the first route data, the first normalized route data comprising a first plurality of normalized positions along the first route; generating second normalized route data using the second route data the second normalized route data comprising a second plurality of normalized positions along the second route; comparing a first position from a first plurality of normalized positions with a first corresponding position from the second plurality of normalized positions, the first position being a first distance along the first route from a first route reference position, and the first corresponding position being the first distance along the second route from a second route reference position; and instructing an autonomous vehicle to begin executing an autonomous vehicle route, the instructing based at least in part on the comparing.

In Example 11, the subject matter of Example 10 optionally includes wherein generating the first normalized route data comprises selecting: selecting the first position; and selecting a second position that is the first distance from the first position along the first route, the first position and the second position being described by the first normalized route data.

In Example 12, the subject matter of Example 11 optionally includes wherein the first position is the first distance along the first route from the first route reference position in a first direction, and wherein generating the first normalized route data further comprises selecting a third position that is the first distance from the first route reference position along the first route in a second direction opposite the first direction.

In Example 13, the subject matter of any one or more of Examples 10-12 optionally includes determining that the first route reference position is within a threshold distance of the second route reference position.

In Example 14, the subject matter of any one or more of Examples 10-13 optionally includes comparing a second position from the first plurality of normalized positions to a second corresponding position from the second plurality of normalized positions, the second position being a second distance along the first route from the first route reference position, and the second corresponding position being the second distance along the second route from the second route reference position.

In Example 15, the subject matter of Example 14 optionally includes determining that the first position is within a threshold distance of the first corresponding position; determining that the second position is within the threshold distance of the second corresponding position; and returning an indication that the first route and the second route are equivalent.

In Example 16, the subject matter of Example 15 optionally includes determining a similarity score for the first route and the second route, the similarity score based at least in part on a distance between the first position and the first corresponding position and at least in part on a distance between the second position and the second corresponding position.

In Example 17, the subject matter of any one or more of Examples 10-16 optionally includes determining that a second position of the first plurality of normalized positions is not within a threshold distance of a second corresponding position of the second plurality of normalized positions; and returning an indication that the first route and the second route are not equivalent.

In Example 18, the subject matter of any one or more of Examples 10-17 optionally includes wherein the first position is the first distance along the first route from a first route reference position along a spherical geodesic.

Example 19 is a machine-readable medium comprising instructions thereon that, when executed by at least one processor, causes the at least one processor to perform operations comprising: accessing first route data describing a first route, the first route data comprising a first plurality of ordered vehicle positions from the first route; accessing second route data describing a second route, the second route data comprising a second plurality of ordered vehicle positions from the second route; generating first normalized route data using the first route data, the first normalized route data comprising a first plurality of normalized positions along the first route; generating second normalized route data using the second route data the second normalized route data comprising a second plurality of normalized positions along the second route; comparing a first position from a first plurality of normalized positions with a first corresponding position from the second plurality of normalized positions, the first position being a first distance along the first route from a first route reference position, and the first corresponding position being the first distance along the second route from a second route reference position; and instructing an autonomous vehicle to begin executing an autonomous vehicle route, the instructing based at least in part on the comparing.

In Example 20, the subject matter of Example 19 optionally includes wherein generating the first normalized route data comprises selecting: selecting the first position; and selecting a second position that is the first distance from the first position along the first route, the first position and the second position being described by the first normalized route data.

Figure 7:
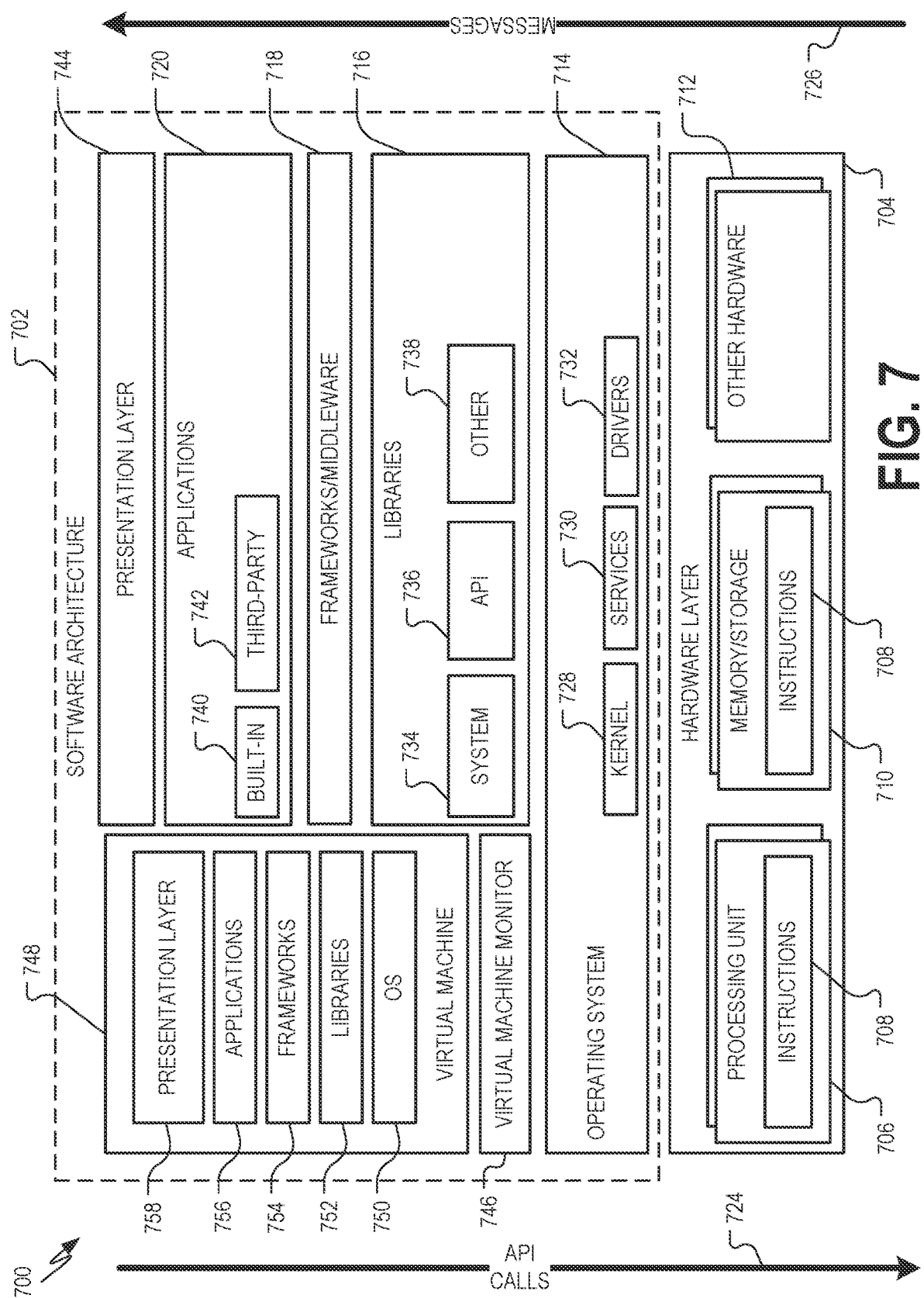
FIG. 7 is a block diagram showing one example of a software architecture for a computing device.

FIG. 7 is a block diagram 700 showing one example of a software architecture 702 for a computing device. The software architecture 702 may be used in conjunction with various hardware architectures, for example, as described herein. FIG. 7 is merely a non-limiting example of a software architecture 702, and many other architectures may be implemented to facilitate the functionality described herein. A representative hardware layer 704 is illustrated and can represent, for example, any of the above-referenced computing devices. In some examples, the hardware layer 704 may be implemented according to an architecture 800 of FIG. 8 and/or the software architecture 702 of FIG. 7.

The representative hardware layer 704 comprises one or more processing units 706 having associated executable instructions 708. The executable instructions 708 represent the executable instructions of the software architecture 702, including implementation of the methods, modules, components, and so forth of FIGS. 1-5. The hardware layer 704 also includes memory and/or storage modules 710, which also have the executable instructions 708. The hardware layer 704 may also comprise other hardware 712, which represents any other hardware of the hardware layer 704, such as the other hardware illustrated as part of the architecture 800.

In the example architecture of FIG. 7, the software architecture 702 may be conceptualized as a stack of layers where each layer provides particular functionality. For example, the software architecture 702 may include layers such as an operating system 714, libraries 716, frameworks/middleware 718, applications 720, and a presentation layer 744. Operationally, the applications 720 and/or other components within the layers may invoke application programming interface (API) calls 724 through the software stack and receive a response, returned values, and so forth illustrated as messages 726 in response to the API calls 724. The layers illustrated are representative in nature, and not all software architectures have all layers. For example, some mobile or special-purpose operating systems may not provide a frameworks/middleware 718 layer, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. In some examples, the services 730 include an interrupt service. The interrupt service may detect the receipt of a hardware or software interrupt and, in response, cause the software architecture 702 to pause its current processing and execute an interrupt service routine (ISR) when an interrupt is received. The ISR may generate an alert.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 716 may provide a common infrastructure that may be used by the applications 720 and/or other components and/or layers. The libraries 716 typically provide functionality that allows other software modules to perform tasks in an easier fashion than by interfacing directly with the underlying operating system 714 functionality (e.g., kernel 728, services 730, and/or drivers 732). The libraries 716 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) may provide a higher-level common infrastructure that may be used by the applications 720 and/or other software components/modules. For example, the frameworks 718 may provide various graphical user interface (GUI) functions, high-level resource management, high-level location services, and so forth. The frameworks 718 may provide a broad spectrum of other APIs that may be used by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. The third-party applications 742 may include any of the built-in applications 740 as well as a broad assortment of other applications. In a specific example, the third-party application 742 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 742 may invoke the API calls 724 provided by the mobile operating system such as the operating system 714 to facilitate functionality described herein.

The applications 720 may use built-in operating system functions (e.g., kernel 728, services 730, and/or drivers 732), libraries (e.g., system libraries 734, API libraries 736, and other libraries 738), or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures use virtual machines. For example, systems described herein may be executed using one or more virtual machines executed at one or more server computing machines. In the example of FIG. 7, this is illustrated by a virtual machine 748. A virtual machine creates a software environment where applications/modules can execute as if they were executing on a hardware computing device. The virtual machine 748 is hosted by a host operating system (e.g., the operating system 714) and typically, although not always, has a virtual machine monitor 746, which manages the operation of the virtual machine 748 as well as the interface with the host operating system (e.g., the operating system 714). A software architecture executes within the virtual machine 748, such as an operating system 750, libraries 752, frameworks/middleware 754, applications 756, and/or a presentation layer 758. These layers of software architecture executing within the virtual machine 748 can be the same as corresponding layers previously described or may be different.

Figure 8:
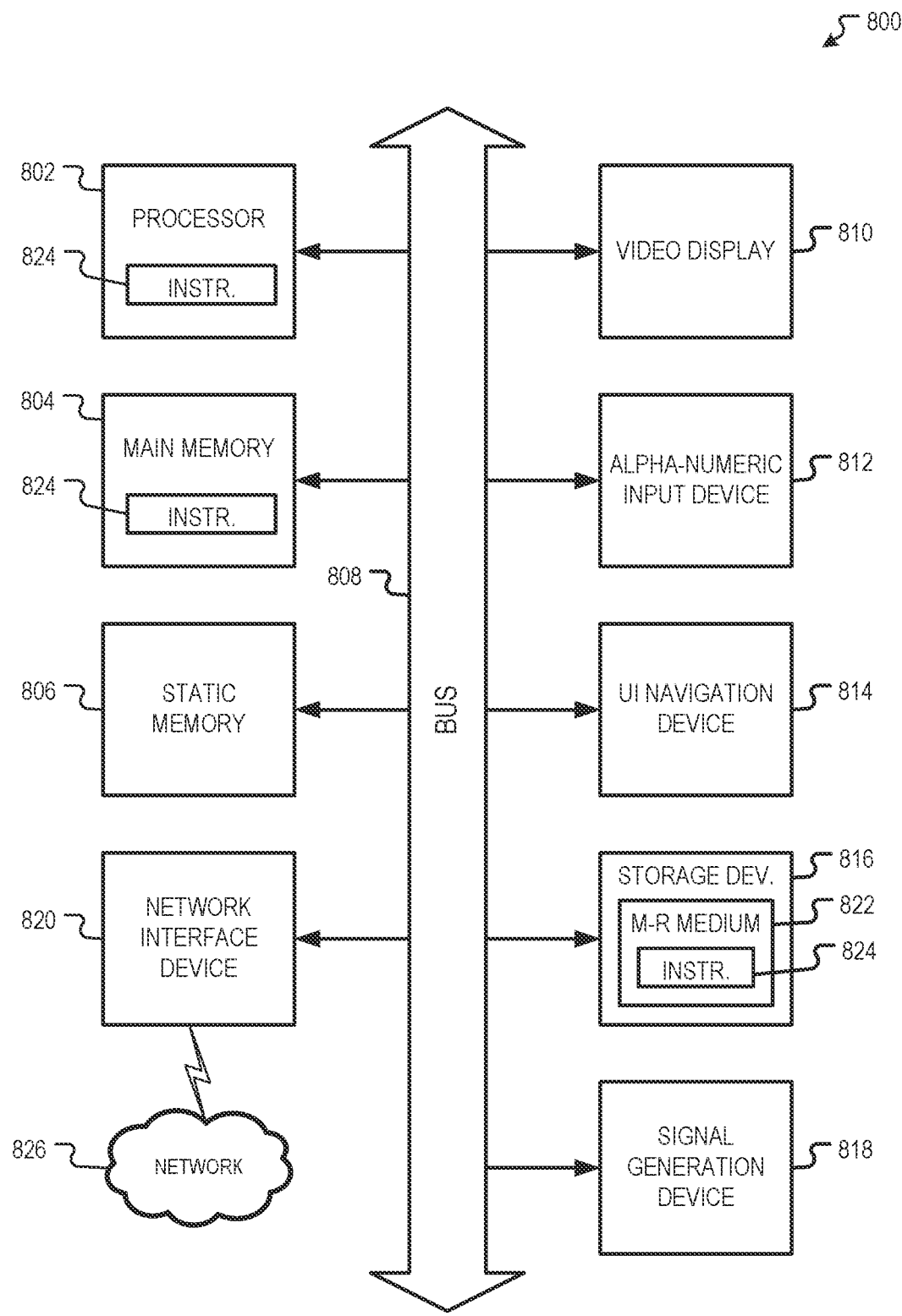
FIG. 8 is a block diagram illustrating a computing device hardware architecture.

FIG. 8 is a block diagram illustrating a computing device hardware architecture 800, within which a set or sequence of instructions can be executed to cause a machine to perform examples of any one of the methodologies discussed herein. The hardware architecture 800 describes a computing device for executing the vehicle autonomy system, described herein.

The architecture 800 may operate as a standalone device or may be connected (e.g., networked) to other machines. In a networked deployment, the architecture 800 may operate in the capacity of either a server or a client machine in server-client network environments, or it may act as a peer machine in peer-to-peer (or distributed) network environments. The architecture 800 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 800 includes a processor unit 802 comprising at least one processor (e.g., a central processing unit (CPU), a graphics processing unit (GPU), or both, processor cores, compute nodes). The architecture 800 may further comprise a main memory 804 and a static memory 806, which communicate with each other via a link 808 (e.g., a bus). The architecture 800 can further include a video display unit 810, an input device 812 (e.g., a keyboard), and a UI navigation device 814 (e.g., a mouse). In some examples, the video display unit 810, input device 812, and UI navigation device 814 are incorporated into a touchscreen display. The architecture 800 may additionally include a storage device 816 (e.g., a drive unit), a signal generation device 818 (e.g., a speaker), a network interface device 820, and one or more sensors (not shown), such as a Global Positioning System (GPS) sensor, compass, accelerometer, or other sensor.

In some examples, the processor unit 802 or another suitable hardware component may support a hardware interrupt. In response to a hardware interrupt, the processor unit 802 may pause its processing and execute an ISR, for example, as described herein.

The storage device 816 includes a machine-readable medium 822 on which is stored one or more sets of data structures and instructions 824 (e.g., software) embodying or used by any one or more of the methodologies or functions described herein. The instructions 824 can also reside, completely or at least partially, within the main memory 804, within the static memory 806, and/or within the processor unit 802 during execution thereof by the architecture 800, with the main memory 804, the static memory 806, and the processor unit 802 also constituting machine-readable media.

Executable Instructions and Machine-Storage Medium

The various memories (i.e., 804, 806, and/or memory of the processor unit(s) 802) and/or the storage device 816 may store one or more sets of instructions and data structures (e.g., the instructions 824) embodying or used by any one or more of the methodologies or functions described herein. These instructions, when executed by the processor unit(s) 802, cause various operations to implement the disclosed examples.

As used herein, the terms "machine-storage medium," "device-storage medium," and "computer-storage medium" (referred to collectively as "machine-storage medium")

mean the same thing and may be used interchangeably. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium" and "device-readable medium" mean the same thing and may be used interchangeably in this disclosure. The terms are defined to include both non-transitory machine-storage media and signal media. Thus, the terms include both storage devices/media and carrier waves/modulated data signals.

The instructions 824 can further be transmitted or received over a communications network 826 using a transmission medium via the network interface device 820 using any one of a number of well-known transfer protocols (e.g., Hypertext Transfer Protocol (HTTP)). Examples of communication networks include a local area network (LAN), a wide area network (WAN), the Internet, mobile telephone networks, plain old telephone service (POTS) networks, and wireless data networks (e.g., Wi-Fi, 3G, 4G Long-Term Evolution (LTE)/LTE-A, 5G, or WiMAX networks).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

The invention claimed is:

1. A computer-implemented system for routing an autonomous vehicle, the system comprising:
   at least one processor unit programmed to perform operations comprising:
   accessing first route data describing a first route, the first route data comprising a first plurality of ordered vehicle positions from the first route;
   receiving second route data describing a second route comprising an alternate route that the autonomous vehicle intends to execute instead of the first route, the second route data comprising a second plurality of ordered vehicle positions from the second route, the second route data being generated by a computing device associated with the autonomous vehicle in response to the computing device receiving the first route data;
   generating first normalized route data using the first route data, the first normalized route data comprising a first plurality of normalized positions along the first route;
   generating second normalized route data using the second route data, the second normalized route data comprising a second plurality of normalized positions along the second route;
   comparing a first position from the first plurality of normalized positions with a first corresponding position from the second plurality of normalized positions, the first position being a first distance along the first route from a first route reference position, and the first corresponding position being the first distance along the second route from a second route reference position; and
   instructing the autonomous vehicle to begin executing an autonomous vehicle route, the instructing based at least in part on the comparing.

2. The system of claim 1, the operations further comprising determining that the first route reference position is within a threshold distance of the second route reference position.

3. The system of claim 1, the operations further comprising:

determining that a second position of the first plurality of normalized positions is not within a threshold distance of a second corresponding position of the second plurality of normalized positions; and returning an indication that the first route and the second route are not equivalent.

4. The system of claim 1, wherein the first position is the first distance along the first route from a first route reference position along a spherical geodesic.

5. The system of claim 1, wherein generating the first normalized route data comprises:

selecting the first position; and selecting a second position that is the first distance from the first position along the first route, the first position and the second position being described by the first normalized route data.

6. The system of claim 5, wherein the first position is the first distance along the first route from the first route reference position in a first direction, and wherein generating the first normalized route data further comprises selecting a third position that is the first distance from the first route reference position along the first route in a second direction opposite the first direction.

7. The system of claim 1, the operations further comprising comparing a second position from the first plurality of normalized positions to a second corresponding position from the second plurality of normalized positions, the second position being a second distance along the first route from the first route reference position, and the second corresponding position being the second distance along the second route from the second route reference position.

8. The system of claim 7, the operations further comprising:

determining that the first position is within a threshold distance of the first corresponding position;

determining that the second position is within the threshold distance of the second corresponding position; and returning an indication that the first route and the second route are equivalent.

9. The system of claim 8, the operations further comprising:

determining a similarity score for the first route and the second route, the similarity score based at least in part on a distance between the first position and the first corresponding position and at least in part on a distance between the second position and the second corresponding position.

10. A computer-implemented method for routing an autonomous vehicle, the method comprising:

accessing first route data describing a first route, the first route data comprising a first plurality of ordered vehicle positions from the first route;

receiving second route data describing a second route comprising an alternate route that the autonomous vehicle intends to execute instead of the first route, the second route data comprising a second plurality of ordered vehicle positions from the second route, the second route data being generated by a computing device associated with the autonomous vehicle in response to the computing device receiving the first route data;

generating first normalized route data using the first route data, the first normalized route data comprising a first plurality of normalized positions along the first route;

generating second normalized route data using the second route data, the second normalized route data comprising a second plurality of normalized positions along the second route;

comparing a first position from the first plurality of normalized positions with a first corresponding position from the second plurality of normalized positions, the first position being a first distance along the first route from a first route reference position, and the first corresponding position being the first distance along the second route from a second route reference position; and instructing an autonomous vehicle to begin executing an autonomous vehicle route, the instructing based at least in part on the comparing.

11. The method of claim 10, further comprising determining that the first route reference position is within a threshold distance of the second route reference position.

12. The method of claim 10, further comprising:

determining that a second position of the first plurality of normalized positions is not within a threshold distance of a second corresponding position of the second plurality of normalized positions; and returning an indication that the first route and the second route are not equivalent.

13. The method of claim 10, wherein the first position is the first distance along the first route from a first route reference position along a spherical geodesic.

14. The method of claim 10, wherein generating the first normalized route data comprises traversing the first route backwards from the first route reference position by a specified amount by:

selecting the first position; and selecting a second position that is the first distance from the first position along the first route, the first position and the second position being described by the first normalized route data.

15. The method of claim 14, wherein the first position is the first distance along the first route from the first route reference position in a first direction, and wherein generating the first normalized route data further comprises selecting a third position that is the first distance from the first route reference position along the first route in a second direction opposite the first direction.

16. The method of claim 10, further comprising comparing a second position from the first plurality of normalized positions to a second corresponding position from the second plurality of normalized positions, the second position being a second distance along the first route from the first route reference position, and the second corresponding position being the second distance along the second route from the second route reference position.

17. The method of claim 16, further comprising:

determining that the first position is within a threshold distance of the first corresponding position;

determining that the second position is within the threshold distance of the second corresponding position; and returning an indication that the first route and the second route are equivalent.

18. The method of claim 17, further comprising:

determining a similarity score for the first route and the second route, the similarity score based at least in part on a distance between the first position and the first corresponding position and at least in part on a distance between the second position and the second corresponding position.

19. A non-transitory machine-readable media comprising instructions thereon that, when executed by at least one processor, causes the at least one processor to perform operations comprising:
- accessing first route data describing a first route, the first route data comprising a first plurality of ordered vehicle positions from the first route;
- receiving second route data describing a second route comprising an alternate route that an autonomous vehicle intends to execute instead of the first route, the second route data comprising a second plurality of ordered vehicle positions from the second route, the second route data being generated by a computing device associated with the autonomous vehicle in response to the computing device receiving the first route data;
- generating first normalized route data using the first route data, the first normalized route data comprising a first plurality of normalized positions along the first route;
- generating second normalized route data using the second route data, the second normalized route data comprising a second plurality of normalized positions along the second route;
- comparing a first position from the first plurality of normalized positions with a first corresponding position from the second plurality of normalized positions, the first position being a first distance along the first route from a first route reference position, and the first corresponding position being the first distance along the second route from a second route reference position; and
- instructing the autonomous vehicle to begin executing an autonomous vehicle route, the instructing based at least in part on the comparing.

20. The non-transitory machine-readable media of claim 19, the autonomous vehicle comprising a first autonomous vehicle, the operations comprising:
- determining that a difference between the first normalized route data and the second normalized route transgresses a threshold; and
- in response to determining that the difference between the first normalized route data and the second normalized route transgresses the threshold, assigning a transportation service to a second autonomous vehicle instead of the first autonomous vehicle.

* * * * *